C. F. FINLEY.
HORSE HAY RAKE.
APPLICATION FILED AUG. 2, 1917.
1,251,492.
Patented Jan. 1, 1918.
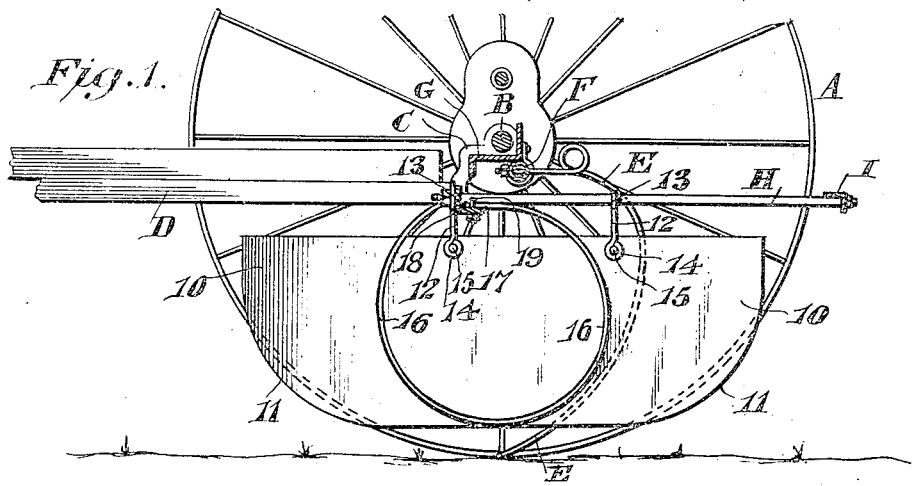
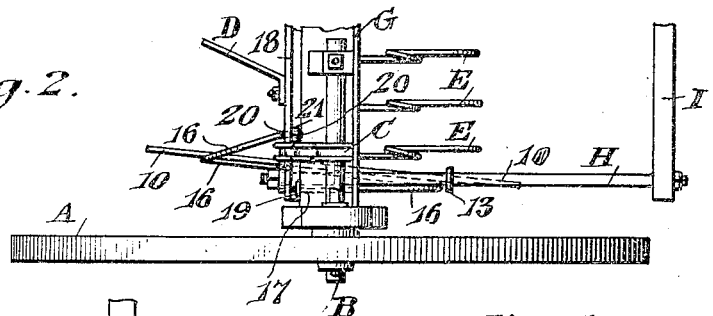
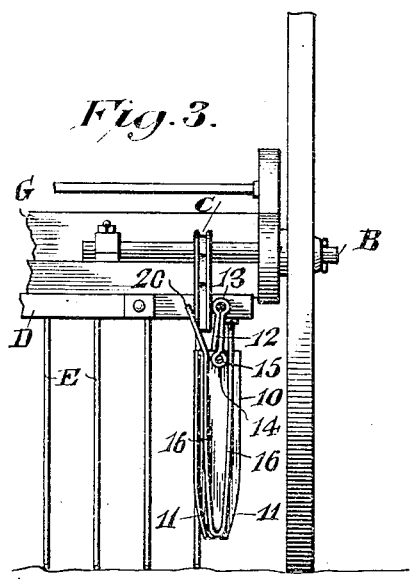
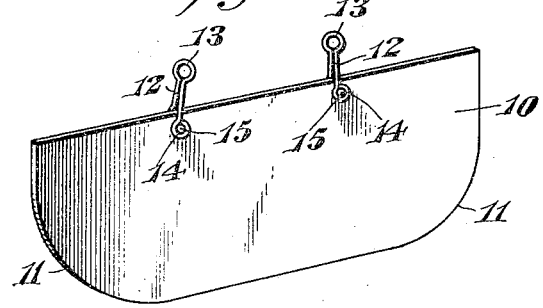
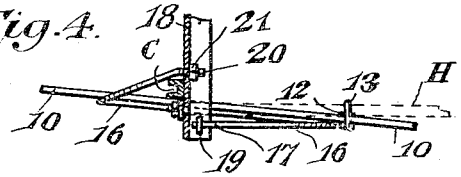
C. F. Finley, INVENTOR
WITNESSES

UNITED STATES PATENT OFFICE.

CHARLES F. FINLEY, OF FORT COLLINS, COLORADO.

HORSE HAY-RAKE.

1,251,492.  Specification of Letters Patent.  Patented Jan. 1, 1918.

Application filed August 2, 1917. Serial No. 184,091.

*To all whom it may concern:*

Be it known that I, CHARLES F. FINLEY, citizen of the United States, residing at Fort Collins, in the county of Larimer and State of Colorado, have invented a new and useful Horse Hay-Rake, of which the following is a specification.

The inventition relates to hay rake attachments, and more particularly to the class of fenders for horse hay rakes.

The primary object of the invention is the provision of an attachment or fender of this character, wherein the opposite ends of the rake will be closed when the same is in raking position, so as to assure a clean raking operation by preventing a constant waste of grass, hay or the like at the ends of said rake as is usual.

Another object of the invention is the provision of an attachment or fender of this character, wherein the fender plate is prevented from outward lateral swinging movement so as to avoid contact with the wheel adjacent thereto of the rake, and the material caught by the rake will be confined therein so as to avoid the entanglement of the load with the wheels, or the winding of the same upon the axle when the rake is drawn through a field.

A further object of the invention is the provision of an attachment or fender of this character which is extremely simple in construction, thoroughly reliable and efficient in its purpose, readily installed upon a horse hay rake, and inexpensive in manufacture.

With these and other objects in view, the invention consists in the features of construction, combination and arrangement of parts, as will be hereinafter fully described, illustrated in the drawings, and pointed out in the claims hereunto appended.

In the accompanying drawing:

Figure 1 is a fragmentary vertical sectional elevation through a horse hay rake showing the attachment of fender constructed in accordance with the invention applied.

Fig. 2 is a fragmentary top plan view.

Fig. 3 is a fragmentary front elevation.

Fig. 4 is a fragmentary horizontal transverse sectional view showing in detail the mounting of the holding hook for the fender section.

Fig. 5 is a perspective view of the fender section detached.

Similar reference characters indicate corresponding parts through the several views in the drawing.

Referring to the drawing in detail, A designates a portion of one of the wheels, B the usual stub shaft or axle upon which said wheel is journaled, C the bracket therefor of the frame D, and E the plurality of tines which are fixed in the rake head F as usual, which is mounted for swinging movement and is supported from the cross bar G of the frame D of the machine in the ordinary well-known manner. Extending rearwardly of the frame D at each end thereof, is the horizontal support H for a cleaner rail I, which is adapted to coact with the tines E of the rake on the swinging of the head for the raising of the tines to automatically clean the same and thereby discharge the full load of hay, grass or other material from the rake.

The fender or attachment is in duplicate for arrangement thereof between the rake proper, including the plurality of tines E and the wheels A, and which comprises a section or plate 10 preferably made from sheet metal although the same may be made from any other suitable material and is provided with rounded lower corner edges 11, the section or plate 10 being preferably of the shape shown in Figs. 1 and 5 of the drawing, and is suspended by hangers 12 which are preferably made from a single length of wire bent on itself to straddle the plate or section 10 and formed with a head eye 13 to embrace the support H and a terminal eye 14 through which is passed a fastener 15 connecting the hanger 12 to the plate or section. These hangers 12 suspend the plate or section 10 from the frame of the rake at each end thereof, so that said plate or section will be disposed between the wheel A adjacent thereto and the end of the rake to close said end when the rake is in operative position to avoid the wasting of the material gathered thereby. The plate or section 10 is disposed a sufficient distance above the ground to clear the usual unevenness in the surface thereof, or small rocks or other obstructions thereon.

Disposed against the outer side of each section or plate 10 is a retaining hoop or coil 16, which has the end 17 thereof fastened to the horizontal portion of the cross angle bar 18 of the frame D through the medium of a clip 19, while the other end 20 of said hoop or coil is passed through the vertical portion of the angle bar 18 and is fastened therein by a nut 21 which is tapped on said end 20 and engages against the inner face of the vertical portion of the bar 18, so that the hoop is securely fastened to the bar in vertical position against the outer face of the plate or section 10, and this hoop or coil prevents the outward lateral swinging of the plate or section 10, so as to prevent the contact thereof with the wheel A adjacent thereto, and in this manner the fender is held in proper position relative to the rake for the clean raking of material upon the ground, when the rake is in normal raking position, without the possibility of the wasting of the material from or out of each end of the rake during the advancement of the machine.

The hoop or coil 16 which has one end 17 thereof fastened to the horizontal portion of the cross-angle bar 18 and the other end 20 passed through the vertical portion of said bar 18 and fastened thereto is prevented from any outward lateral thrust because the end 20 is directed inwardly above the plate or section 10 and is fastened to the bar 18 at a point inwardly with respect to the vertical plane of the plate or section and in this manner the possibility of the outward movement of the hoop or coil is eliminated.

From the foregoing it is thought that the construction and manner of operation of the invention will be clearly understood, and, therefore, a more extended explanation has been omitted.

What is claimed is:—

1. The combination with a hay rake having supporting wheels and a rake between the wheels, of a pair of vertical fenders, one arranged between each wheel and the adjacent end of the rake, hangers for suspending the fenders, and a hoop vertically supported and disposed against the outer face of each fender to prevent outward lateral displacement thereof.

2. The combination with a hay rake having supporting wheels and a rake between the wheels, of a pair of vertical fenders, one arranged between each wheel and the adjacent end of the rake, hangers for suspending the fenders, a hoop disposed against the outer face of each fender to prevent outward lateral displacement, a bar arranged transversely of the frame of the rake, and means for fastening each hoop to the bar.

3. The combination with a wheeled rake having a vertically swinging rake and a support for a cleaning rail, of fenders located between the wheels and adjacent ends of the swinging rake, hangers engaging the support and the fenders for suspending the same, and hoops vertically disposed and fixed beyond the swinging rake and engaging against the outer sides of the fenders to hold the same against outward lateral displacement.

4. The combination with a wheeled rake having a vertical swinging rake and a support for a cleaning rail, of vertically disposed plates constituting fenders located between the wheels and adjacent the ends of the swinging rake, hangers engaging this support and each fender for suspending the same, and hoops vertically disposed and having their ends fixed to the frame of the rake and engaging against the outer sides of the fenders to hold the same against outward lateral displacement, the fixed ends of each hoop being spaced from each other with one end disposed inwardly from the vertical plane of the fender, while the other end is located outside of said vertical plane of the fender to prevent end thrust of the fender and hoop.

In testimony that I claim the foregoing as my own I have hereto affixed my signature in the presence of two witnesses.

CHARLES F. FINLEY.

Witnesses:
VERNOLL WOLF,
C. A. POLLEY.

Copies of this patent may be obtained for five cents each, by addressing the "Commissioner of Patents, Washington, D. C."